Dec. 25, 1951  H. J. HAUCK ET AL  2,579,569
ELECTRIC GAUGE
Filed Sept. 22, 1945

INVENTOR.
HARRY J. HAUCK:
GEORGE A. HIGHBERG.

BY Louis V. Lucia
ATTORNEY.

Patented Dec. 25, 1951

2,579,569

UNITED STATES PATENT OFFICE 2,579,569

ELECTRIC GAUGE

Harry J. Hauck, New Britain, and George A. Highberg, West Hartford, Conn., assignors to Modern Tools, Incorporated, a corporation of Connecticut Application September 22, 1945, Serial No. 618,006

2 Claims. (Cl. 33—147)

This invention relates to electric gages and more particularly to an electric limit gage adapted to indicate when a piece of work being gaged is outside of allowed plus and minus limits.

An object of this invention is to provide such an electric gage which has a maximum degree of accuracy and which can be adjusted so as to gage parts of high precision for very close dimensional limits.

A further object of this invention is to provide an electric gage which can be adjusted accurately for extremely small tolerances and which will maintain its accuracy for a maximum length of time.

A still further object of this invention is to provide such an electric gage which is controlled by an electric circuit that may be contained entirely within the gage.

Another object of this invention is to provide an electric gage that may be readily used in connection with a production machine, so as to automatically gage the parts being produced in the machine and control the machine in accordance with the accuracy of said parts as to a certain dimension.

Further objects and advantages will be more clearly understood from the following description and from the accompanying drawings in which.

Figure 7:
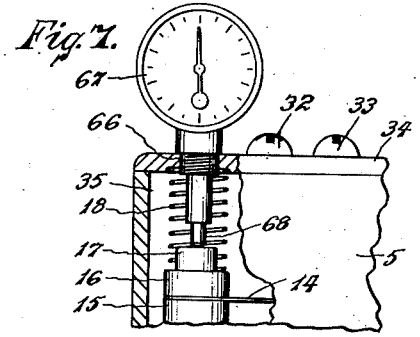
Fig. 7 is a fragmentary view, partly in central vertical section, showing the use of an indicating micrometer in connection with our electric gage.
Figure 1:
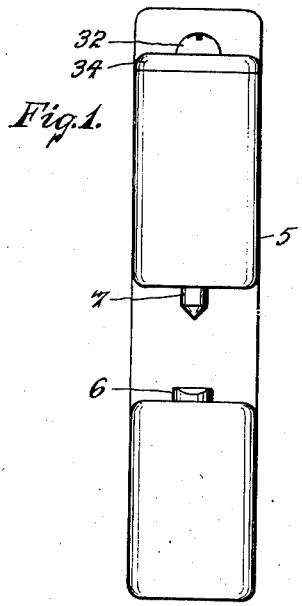
Fig. 1 is a front view, in elevation, of our improved electric gage.
Figure 2:
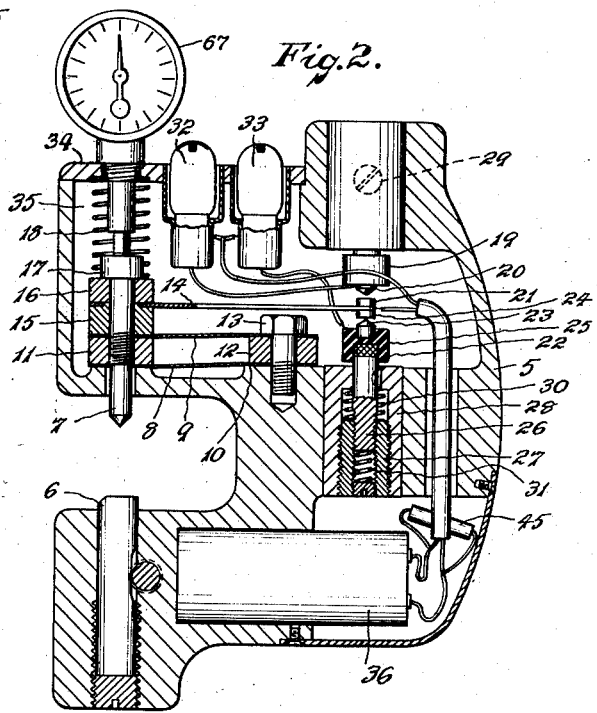
Fig. 2 is a side view thereof, in central vertical section.

As illustrated in the drawings, our improved electric gage may comprise a frame 5 having an adjustable anvil 6 and a movable gaging finger 7 which is carried by spaced parallel strips 8 and 9 that are mounted upon the surface 10 within the frame 5. The said strips are secured, at one end, to a block 11 and, at the other end, to a block 12 which is anchored in position upon the surface 10 by means of a bolt 13. If desired, the said strips may be secured to said blocks 11 and 12 by such as brazing, or in any other suitable manner.

A contact bar 14 is secured to the measuring finger 7 by means of a spacer 15 and a washer 16. The finger 7 extends through said spacer and is threaded to the block 11 so that the bar 14 will be rigidly connected to the finger 7 to move therewith. The said finger 7 preferably has a head 17 above the washer 16 and a spring 18 is provided for forcing the finger in a direction towards the anvil 6.

An electric contact support 19 is mounted at one side of the bar 14 and carries a contact 20 opposite a contact 21 on the said bar. A similar support 22 is mounted at the opposite side of the bar 14 and carries a contact 23 opposite the contact 24 on said bar. Each of the contact supports 19 and 22 is preferably constructed with an insulated head 25 within which the contacts 20 and 23 are mounted. The said contact supports each also have a stem portion 26 which is threaded to a sleeve 27 that in turn has an external thread by which it is threaded to a supporting sleeve 28 that is slidably mounted in said frame 5 and secured therein by means of a suitable set screw 29. The said sleeve 27 is retained in an adjusted position by means of a retaining spring 30 which maintains a tension between said adjusting sleeve 27 and the supporting sleeve 28.

The stem 26 is slidable within an opening in the supporting sleeve 28 and is preferably keyed thereto against relative rotation so that it will not turn with the rotation of the sleeve 27. A spring 31 is also provided between the end of said stem and the adjusting sleeve 27 for applying a tension to retain the sleeve in an adjusted position and also to eliminate end-wise movement between the threads of the stem and the sleeve.

A pair of light bulbs 32 and 33 are provided for said gage and are preferably mounted at the top of the frame 5, in a cover 34, and depend partly within the recess 35 in said frame. The bulb 32 is preferably marked to indicate "plus" while the bulb 33 is marked to indicate "minus."

Figure 3:
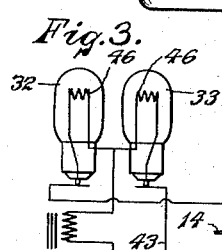
Fig. 3 is a diagrammatic view illustrating the electric circuit used in said gage.
Figure 4:
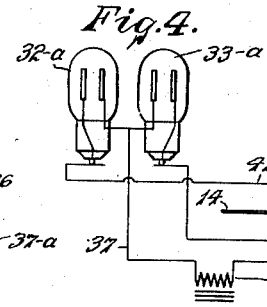
Fig. 4 is a diagrammatic view illustrating a modified form of the electric circuit.

An electric circuit is provided in said gage which, as illustrated in Figs. 3 and 4, preferably consists of an electric battery 36, one side of which is connected through a conductor 37, which contains a switch 37-a, to both of the bulbs 32 and 33 whose filaments 46, when in use, illuminate with only a few milliamperes of electrical current. Another conductor 40 extends from the other side of said battery to both of the contacts 21 and 24 on the contact bar 14. The contact 20 is connected, by a conductor 41, to the bulb 32 and the contact 23 is connected by a conductor 43 to the bulb 33.

A suitable condenser 45 is provided between the conductors 37 and 40 to absorb electrical energy during the opening or closing of the contacts 20 and 21, or 23 and 24, thus preventing arcing effects between said contacts. If desired, the bulbs 32 and 33 and the electric supply source, such as a battery 36, may be grounded to the frame 5 to thereby eliminate the conductor 37.

Figure 5:
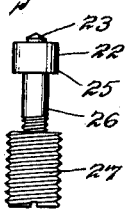
Fig. 5 is a side view in elevation of a contact member and adjusting screw used in said gage.

In the modified form of circuit illustrated in Fig. 5, the bulbs 32-a and 33-a are preferably gas type bulbs of such as neon or the like and commonly having a pair of electrodes providing an air gap between them in a low pressure chamber. In this circuit, the current may be supplied directly from an external source of energy through a cord 47.

In the application of our improved electric gage illustrated in Fig. 7, a relay 56 may be connected, preferably in series within the conductor 37, as shown in Fig. 5, to operate an electric relay switch 57, as will be more fully hereinafter described. The said relay may be controlled by a switch 58 which is operated by a lever 59 on the supporting bracket 60, which pivotly supports the gage, and the conductors to said magnet 56 may be extended outwardly of the casing, from the conductor 37, through a flexible cable 61.

A motor 62, for operating the machine, is connected in the circuit in parallel with our electric gage and the operation of said motor is controlled by the switch 57 which is operated by the relay 56.

Figure 6:
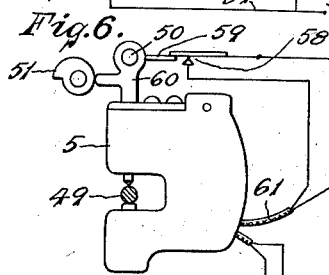
Fig. 6 is a diagrammatical view showing the use of our improved gage for the control of a production machine.

As will be clearly seen from Fig. 6 of the drawings, the stem 26, for the contact member thereon, is threaded to the sleeve 27 with a thread running in the same direction as the thread with which the sleeve 27 is threaded to the supporting sleeve 28. The thread between the stem 26 and the sleeve 27 is finer, or of a lesser pitch, than the thread between the said sleeve and the supporting sleeve 28 so that, when the sleeve 27 is turned, the movement of the stem 26, towards the position to which it is to be adjusted, is considerably less than the movement of the sleeve 27 resulting from the pitch of the coarser thread thereon. This permits a much finer adjustment of the stationary contact on the member 26, by rotation of the sleeve 27, than could be obtained were the contact member permitted to be adjusted by the movement of the sleeve 27 alone. It will be understood that the difference between the pitch of the thread with which the stem 26 is threaded to the sleeve 27 and that of the coarser thread with which the sleeve 27 is threaded to the sleeve 28 may be such that a very small amount of movement is applied to the said stem by rotation of the sleeve. In other words, a very small part of the pitch of the coarser thread will be used in moving the stem 26 since the major portion of said pitch will be nullified by reverse action of the pitch of the finer thread in the stem 26. Further, as the sleeve 27 is being turned for movement in one direction, the stem 26 will move in the said sleeve, but the relative movement between the sleeve and the stem will not be quite as much as the movement of the sleeve 27 relative to its supporting sleeve 28 and, therefore, the movement of the stem 26 will be equal to the difference of the values of the pitch in the two threads on members 25 and 27. This renders it possible to provide a very small amount of travel for the contacts 23 and 20, for the relative rotation of the sleeve 27, and thereby permits adjustment of said contact members to a very fine degree. As an example, it is possible to provide an adjustment of a fraction of a thousandth of an inch with a substantial rotation of the sleeve 27 and the gage may be adjusted to permit a distance as short as a few millionths of an inch between the contact members, to allow for extremely small "plus" or "minus" tolerance in the dimension for which a part is to be gaged. Such adjustment would be impossible to obtain with an adjustment depending upon a single thread, as a thread could not be made fine enough to permit such a delicate adjustment.

It will be noted that, in the normal condition of the gage, the finger 7 is held in a downward position by the pressure of the spring 18 and the circuit is closed at the contacts 23 and 24.

In the electric circuit used in our improved gage, as shown in Fig. 4, a possibility of arcing across the gap between the contacts 20 and 21 and 23 and 24 is greatly minimized by the fact that the voltage of the battery 36 is in the order of one and one-half volts. Hence, the accuracy of the gage is within a few millionths of an inch as a voltage of this low value nature will not cause the current to pass through a gap greater than in the order of a few millionths.

After contacts 20 and 21 or 23 and 24 have been closed in a gaging operation, one of the lights 32 or 33 will glow, depending upon which contacts are closed by the condition of the part being gaged. In the breaking of these contacts, after the gaging operation, the condenser 45 tends to absorb the energy stored in the circuit and thereby prevents arcing across the contacts 20 and 21 or 23 and 24 at the time of opening. This prevents the contacts 20, 21, 23 and 24 from becoming oxidized by the heat of a spark which would otherwise jump across the gap and thereby maintains the accurate adjustment of said contacts over a long period of time.

In Fig. 5, there is shown a modified type of electric circuit for our improved gage. Here the possibilities of arcing across the gap between the contacts 20 and 21 and 23 and 24 is prevented by the use of gas type bulbs, 32-a and 33-a, which are so constructed that there is sufficient distance between the electrodes therein to provide an infinite resistance to the electric current in the circuit, except upon ionization of the inert gas in said bulbs. In addition to the gas type bulbs, we provide a sensitive relay having high inductance, such as a relay 56, or a condenser having conductive reactance such as condenser 63, or resistor 64 of suitably high resistance which further increases the overall impedance, so that the total impedance of the inductance, or the capacitance, or the resistor and the bulbs, will be such that the current will not flow through the circuit until actual contact is made between the circuit closing contacts. Therefore, no current will jump across the minute gap between the contacts and the gage is thereby rendered operable for the smallest possible tolerance. This tolerance may be even as small as a few millionths of an inch since the current will not jump across such a distance unless actual contact is made.

It is to be noted that stationary contacts 20 and 23 are pointed so that the actual contact area is relatively small in the stationary contacts when compared to the total area of contacts 21 and 24. The purpose of having the said contacts pointed is that the electrical capacitance between the contacts must be maintained at a minimum to insure that conductive effects will not exist when the contacts are very nearly closed and thus cause the bulbs 32-a and 33-a to light prematurely to actual contact between contacts 20 and 21 or 23 and 24.

In the breaking of contacts 20 and 21, and 23 and 24, arcing is also minimized to a significant extent by the fact that the sixty cycle alternating current wave passes through zero three times during one cycle. Therefore, any arcing that might exist would disappear in less time than one one hundred and twentieths of a second. Because the current is maintained by the overall resistance of the circuit at the very low order of a fraction of a milliampere to perhaps 3 or 4 milliamperes, depending upon the constant of the circuit, there is no appreciable opportunity for contact oxidization due to the very minute amount of energy expended across the contacts upon opening. Hence, the gage is as accurate in breaking, or during a breaking operation, as during the making of the contact, thus increasing the value of the gage for gaging operations where only very small plus and minus tolerances are allowed.

The operation of our improved electric gage is as follows:

Assuming that the said contacts have been adjusted for the tolerances allowed in the dimension for which the part is to be gaged, the said part is placed between the anvil 6 and the finger 7. This will move the said finger upwardly by flexing the parallel bars 8 and 9 which will retain the said finger in substantially vertical alignment and move the bar 14 upwardly with its contacts 21 and 24. If the part being gaged is within the limits, the contacts 21 and 24 will rest out of contact with both of the contacts 20 and 23. Should the dimension be larger than the maximum allowed, the contact 21 will engage with the contact 20 and thereby close the electric circuit to the "plus" bulb 32 and cause said bulb to ignite; thus indicating at sight that the part being gaged is over-sized. Should the dimension be smaller than the minimum allowed, the contact 24 will remain in contact with the contact 23 and thereby maintain closed the circuit to the "minus" bulb 33 and indicate that the part is under-sized.

From the above description it will be clearly understood that we have provided a novel electric gage which can be very closely adjusted and which, by means of the extremely high resistance provided in the electric circuit, will not permit the passage of current except upon actual contact and the gage is rendered operable for even the closest tolerances.

As clearly illustrated in Fig. 5 of the drawings, the gas bulbs are of common type, such as comprise a pair of electrodes that are mounted within the bulb in a low pressure atmosphere filled with a suitable gas. The low pressure in said gap increases the resistance in the electric circuit and prevents ionization between the electrodes until actual contact is made between the contact points, such as 20 and 21 or 23 and 24. Also, the said contact points being exposed to atmospheric pressure, which is a high pressure as compared to the lower pressure in the gas bulbs, will necessitate a high voltage before a breakdown can occur in the gap between the contact points and the atmospheric pressure and a low voltage to cause ionization of the gases between the electrodes in the low pressure atmosphere of the gas bulbs so that a jump of current across the gaps in the atmospheric pressure is prevented on the "make" of the circuit and a similar jump or spark between said contacts will be prevented on the "break" of the circuit by the comparatively low current flow across the low pressure which would break immediately upon separation of the contacts.

In view of these facts, it will be readily understood that actual contact is necessary to cause operation of the gas bulbs for indicating measurements and thereby extreme accuracy of operation for measurements as close as one one-millionth of an inch is rendered practical in the device of our invention.

It is well known that, when a sufficiently high voltage is applied to two operated electrodes in any gas medium, the gas itself will break down suddenly, the practically infinite resistance between the two electrodes will drop to a very low value, and the resulting molecular disturbance will cause the reuniting gas ions to give off visible energy, the color of which depends upon the type of gas in the medium. After this electrical breakdown of the gas occurs, considerable electric current is conducted and will continue to flow as long as the voltage is applied to the electrodes.

This conduction of electric current is due to ions which are generated when the electrical stress between the two electrodes is so great that electrons are broken free from their normal orbits in the gas atoms. The resulting collisions further "ionize" the gas and create a plentiful supply of free positive ions and negative electrons between or near the two electrodes. When the voltage or electrical stress between the electrodes is removed, the free ions recombine to form normal gas molecules, current ceases to flow, and visible energy disappears.

The voltage or electrical stress at which any gas will break down is dependent upon gas pressure, electrode spacing and electrode material. If the electrodes are metallic, the most important factors which determine breakdown voltage are gas pressure and electrode spacing.

If two electrodes are spaced a short distance apart in a gas medium at atmospheric pressure, several thousands of volts may be required to cause ionization, or electrical breakdown from very high inter-electrode resistance to a resistance of a very low value. However, if the same two electrodes are spaced in a very low pressure gas medium, ionization, or other reduction of inter-electrode resistance would occur at a greatly reduced critical or "breakdown" voltage.

This is the principle upon which the gages of the present invention depend for accuracy of operation. However, we have added another important feature which co-operates with the electronic, or ionization, principle to make the complete gage. This additional feature consists of a second pair of electrodes, such as the contact points 20 and 21, or 23 and 24, which are located in a high or atmospheric pressure medium of gas or air and connected electrically in series with the electrodes of the gas bulbs which are in the low pressure medium of the gas bulbs.

It will, therefore, be readily understood that in a circuit as illustrated in Fig. 5, an infinite resistance is obtained between the electrodes of the gas bulbs and therefore a high voltage is required across the contacts 20 and 21, which are in a high pressure medium, before an interelectrode breakdown can be caused. This permits the use of the gage of our present invention for extremely close measurements, such as in the order of one-millionth of an inch, since current will not jump across the said contacts in the high-pressure medium until actual contact is made. The construction of the contacts 20 and 24, wherein they are pointed, reduces condenser action between the said points and the points 21 and 23 and thus further reduces the possibility of current passing across the gap between such contacts before actual contact is made.

In the use of our improved gage for automatically gaging parts as they are produced in a production machine, as illustrated in Fig. 7, rotation of the cam 51 will cause the gage to be moved into and out of contact with the successive parts produced in the machine. As long as the parts are within the pre-determined limits for which the gage has been set, the machine will be permitted to continue to operate without interference. As each part is completed, and the cam 51 moves the gage away from the work, the lever 59 opens the switch 58 so that, as the contacts 23 and 24 are brought into engagement by the spring 18, no current will flow through the relay 56 and the switch 57 will remain closed. The said switch 58 is again closed when the gage is moved into engagement with the part 49. Then, should the dimension for which the part 49 is being gaged be outside of an allowed limit, the low voltage circuit in the gage will be closed; this will energize the relay 56 which will then open the switch 57 and thereby de-energize the motor 62 and stop the operation of the production machine.

Our improved gage is provided with an indicating micrometer 67, of a suitable type, that is mounted therein with the plunger 68 thereof engaging the top of screw 17. This will provide indication of the actual measurements, or the amount of error in a dimension of the piece being gaged while, at the same time, the bulbs 32 and 33 will show whether or not the piece is within the limits allowed and for which the gage has been set.

We claim:

1. An electric gage comprising a frame having a stationary gaging member, a longitudinally movable gaging member spaced above said stationary member and substantially on an axis therewith, said movable member being elongated and having a portion extending downwardly through an opening in said frame for contacting a part being gaged and resting upon said stationary member, a spaced pair of parallel bars secured at one end to said movable member and extending therefrom, the opposite ends of said bars being anchored in said frame in spaced position to thereby flex uniformly and permit movement of the movable gaging member substantially on the axis thereof, spring means urging said members in the direction of the stationary member, stop means in said frame for limiting the movement of said movable gaging member towards the stationary gaging member, a separate bar extending from said movable gaging member to a point located rearwardly of the anchoring means for the said flexible bars, contact means carried upon the free end of said separate bar, adjustable contacts mounted in said frame and vertically spaced on the axis of said contact means, an electric circuit controlled by said contact means, and light means in said circuit for indicating the condition of a part being gaged.

2. An electric gage as set forth in claim 1 including an indicating micrometer device mounted on said frame and having an operating plunger movable with said movable gaging member for indicating measurements of the part being gaged.

HARRY J. HAUCK.
GEORGE A. HIGHBERG.

REFERENCES CITED

The following references are of record in the file of this patent:

UNITED STATES PATENTS

| Number | Name | Date |
|---|---|---|
| 731,011 | Mietaschk | June 21, 1904 |
| 2,005,887 | Carson | June 25, 1935 |
| 2,172,719 | Weant | Sept. 12, 1939 |
| 2,177,051 | Birmingham | Oct. 24, 1939 |
| 2,240,184 | Hathaway | Apr. 29, 1941 |
| 2,254,313 | Poock et al. | Sept. 2, 1941 |
| 2,294,831 | Carson | Sept. 1, 1942 |
| 2,302,104 | Carson | Nov. 17, 1942 |
| 2,327,629 | Fedorchak | Aug. 24, 1943 |
| 2,338,868 | Owens | Jan. 11, 1944 |
| 2,344,595 | Calow et al. | Mar. 21, 1944 |
| 2,350,862 | Ayers | June 6, 1944 |
| 2,382,885 | Landay et al. | Aug. 14, 1945 |
| 2,384,529 | Breitenstein | Sept. 11, 1945 |
| 2,399,113 | Guenther | Apr. 23, 1946 |
| 2,459,261 | Browne | Jan. 18, 1949 |

OTHER REFERENCES

Publication of Product Development and Engineering Corp., Cleveland, Ohio, advertising and describing "model 2-2 Electromike" comparator gage (2 pages).

Publication: "Review of Scientific Instruments," vol. 12, page 105, February 1941.